US008184201B2

(12) United States Patent
Thaly et al.

(10) Patent No.: US 8,184,201 B2
(45) Date of Patent: May 22, 2012

(54) METHOD AND APPARATUS FOR AUTOMATIC AUDIO STANDARD DETECTION IN TERRESTRIAL BROADCAST SIGNALS EMPLOYING FREQUENCY SCANNING

(75) Inventors: Amogh D. Thaly, Caranzalem (IN); Srikanth Alaparthi, Guntur (IN); Sudheesh A. Somanathan, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 1199 days.

(21) Appl. No.: 11/934,783

(22) Filed: Nov. 4, 2007

(65) Prior Publication Data
US 2009/0115896 A1 May 7, 2009

(51) Int. Cl.
*H04N 7/00* (2011.01)
*H04N 5/60* (2006.01)
*H04N 11/00* (2006.01)
*H04N 5/46* (2006.01)
*H04N 5/14* (2006.01)
*H04N 5/44* (2011.01)

(52) U.S. Cl. ........ 348/484; 348/738; 348/462; 348/465; 348/558; 348/604; 348/725

(58) Field of Classification Search .................. 348/484, 348/738, 462, 465, 558, 604, 725; 381/22, 381/23, 2, 119; 455/283, 3.02; 375/236
See application file for complete search history.

(56) References Cited

U.S. PATENT DOCUMENTS

| 5,220,602 | A | * | 6/1993 | Robbins et al. | 380/236 |
|---|---|---|---|---|---|
| 5,787,334 | A | * | 7/1998 | Fardeau et al. | 725/22 |
| 5,809,133 | A | * | 9/1998 | Bartkowiak et al. | 379/386 |
| 6,147,713 | A | * | 11/2000 | Robbins et al. | 348/555 |
| 6,359,944 | B1 | * | 3/2002 | Curtis et al. | 375/344 |
| 6,476,878 | B1 | * | 11/2002 | Lafay et al. | 348/738 |
| 6,697,439 | B1 | * | 2/2004 | Trivedi et al. | 375/326 |
| 7,518,661 | B2 | * | 4/2009 | Alderson | 348/738 |
| 2001/0050926 | A1 | * | 12/2001 | Kumar | 370/529 |
| 2004/0223553 | A1 | * | 11/2004 | Kumar | 375/259 |
| 2005/0036074 | A1 | * | 2/2005 | Nhu | 348/738 |
| 2005/0239398 | A1 | * | 10/2005 | Lai | 455/3.02 |
| 2006/0183453 | A1 | * | 8/2006 | Muhammad et al. | 455/283 |

OTHER PUBLICATIONS

Guner Arslan, Fast Fourier Transforms, 2005, University of Texas, Lecture 21, signal.ece.utexas.edu/~arslan/courses/dsp/lecture21.ppt.*
Naim Dahnoun, Goertzel Algorithm, 2004, Bristol University, Texas Instruments, http://www.ti.com/ww/cn/uprogram/share/ppt/c6000/Chapter17.ppt.*

* cited by examiner

*Primary Examiner* — Hoang-Vu A Nguyen-Ba
(74) *Attorney, Agent, or Firm* — Kenyon & Kenyon LLP

(57) ABSTRACT

A method and apparatus for automatic audio standard detection in terrestrial broadcast signals is disclosed. In one embodiment, a method of detecting automatic audio standard for terrestrial broadcast includes scanning for each known audio frequency standard of interest in a current band energy spectrum in an incoming broadcast signal using a standard of non standard energy estimation algorithm, such as Goertzel DFT or FFT based algorithm for a predetermined time interval. At each known audio frequency standard of interest, energy is computed using the associated standard or non standard energy estimation algorithm within the predetermined time interval. The computed energy at each known audio frequency standard of interest is then compared to predetermined threshold energy. At each known audio frequency standard of interest, it is determined whether the audio frequency standard of interest is detected based on the outcome of the comparison.

36 Claims, 5 Drawing Sheets

METHOD AND APPARATUS FOR AUTOMATIC AUDIO STANDARD DETECTION IN TERRESTRIAL BROADCAST SIGNALS EMPLOYING FREQUENCY SCANNING

FIELD OF THE INVENTION

The present invention relates generally to signal processing and more particularly to a method and apparatus for automatic audio standard detection in terrestrial broadcast signals.

BACKGROUND

A television or video recorder includes a terrestrial broadcast signal receiver (or television receiver) to receive terrestrial broadcast, cable television or satellite broadcast signals and to process the signals into appropriate video and audio signals for display, for hearing, and/or for recording. Audio signals in the television signals are transmitted in analog or digital formats and in accordance with a variety of standards. For audio analog television transmissions, the NTSC (National Television Standards Committee) standard, the PAL (Phase Alternate Lines) standard, BTSC (Broadcast Television System Committee) standard, EIAJ standard, A2 (Dual Tone or Zweiton) KOREA standard, A2 BG standard, A2-DK1-3, SECAM (Séquentiel Couleur A Mémoire)-L standards are widely used. On the other hand, for audio digital television transmissions, the PAL standard and NICAM (Near Instantaneous Companded Audio Multiplex)-BG, DK, I and L standards are available.

Multi-standard equipments are known. In most instances, multi-standard equipments use the decoder core in the terrestrial broadcast signal receivers to automatically identify the audio standard of an incoming signal for demodulation purposes. Because the different audio television formats and different audio television standards are incompatible, current techniques in terrestrial broadcast signal receivers require stopping partially or fully the decoding operation of the Sound Intermediate Frequency (SIF) signal and using the entire or part of the decoder to identify the audio standard when using the decoder core. This is due to the nature of the existing auto standard detection model that requires serially demodulating the incoming television signal for each of the above existing standards and checking for associated valid output or demodulated energy. Therefore, the present auto standard detection techniques are not practical for plug and play operation of demodulator. In addition, the current techniques require extensive external controller intervention for effectively implementing the auto detection of audio standards in terrestrial broadcast signals.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method and apparatus for automatic audio standard detection in terrestrial broadcast signals is disclosed. In the following description, for purposes of explanation, numerous specific details are set forth in order to provide a thorough understanding of the various embodiments. It will be evident, however, to one skilled in the art that the various embodiments may be practiced without these specific details.

The term "broadcast signal" refers to "terrestrial broadcast", "cable television" or "satellite broadcast" signals. Also, the terms "terrestrial broadcast" and "terrestrial broadcast signals" are used interchangeably throughout the document. The term "Goertzel DFT" refers to a Goertzel filter that computes energy at a given frequency of the incoming broadcast signal. Further, the terms "Goertzel DFT" and "Goertzel's algorithm" are used interchangeably throughout the document.

Figure 1:
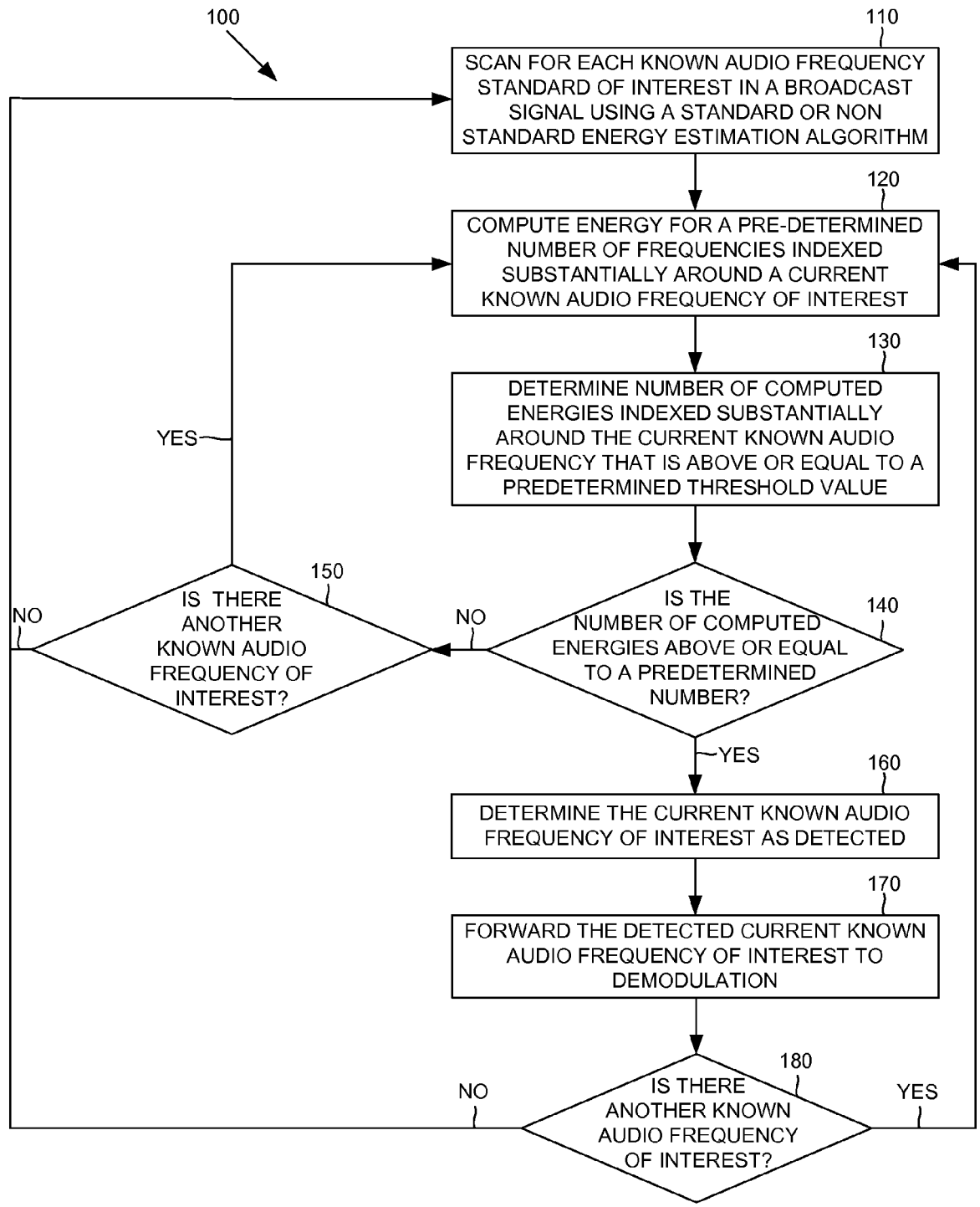
FIG. 1 is a process flow illustrating a method of automatic audio standard detection for terrestrial broadcast, according to one embodiment.

FIG. 1 is a process flow 100 illustrating a method of automatic audio standard detection for terrestrial broadcast, according to one embodiment. In operation 110, each known audio frequency standard of interest is scanned for in a current SIF frequency band in an incoming broadcast signal (e.g., may include a television signal and/or a radio signal) by using a standard/non standard energy estimation algorithm or any specific standard algorithms such as Goertzel DFT 310 and/or FFT based algorithm. In some embodiments, the current SIF frequency band is approximately in the range of about 0 to max 10 MHz.

In some embodiments, during scanning, the Goertzel's algorithm is used and these Goertzel's algorithm filters are derived using the equation:

$$H_k(Z) = (1 - W^*_N Z^{-1})/(1 - 2\cos(2\pi K/N)Z^{-1} + Z^{-2})$$

wherein, $H_k(Z)$ is the transfer function evaluated at the $k^{th}$ bin in the z-plane, Z—refers to the z-plane of a Z transform, K refers to the $k^{th}$ point or $k^{th}$ bin (e.g., each bin is mapped to one particular frequency point), and N is the number of points in the Fourier Transform. Each of the Goertzel's algorithm filters includes a second order filter. In some embodiments, scanning for each known audio frequency standard of interest in the current SIF frequency band includes dynamically scanning for each known audio frequency standard of interest in the current SIF frequency band substantially parallelly with the demodulation operation without interrupting the demodulation operation. In these embodiments, during scanning, the audio frequency standard of interest comprises an analog audio frequency standard (e.g., may include primary and secondary analog audio standard frequencies) or a digital audio frequency standard (e.g., may include primary and secondary digital audio standard frequencies).

In operation 120, energy is computed for a predetermined number of frequencies indexed substantially around a current known audio frequency standard of interest within the current band energy spectrum. In these embodiments, either a standard or non standard energy estimation algorithm, such as a Goertzel DFT (i.e., the Goertzel DFT 310 of FIG. 3) or FFT based algorithm is configured to receive the broadcast signals and compute energy substantially around each of known audio frequency standards of interest within the current SIF frequency band for the predetermined time interval (e.g., the predetermined interval of time may be in the range of about 1-10000 milliseconds).

In operation 130, a number of computed energies indexed substantially around the current known audio frequency that are above or equal to a predetermined threshold value is determined. In these embodiments, the number of computed energies is determined by comparing each of the computed energies that is substantially around each known audio frequency standard of interest with the predetermined threshold value.

In operation 140, the process flow 100 determines whether the number of computed energies is above or equal to the predetermined number (e.g., counter threshold). The process flow 100 goes to operation 150, if the number of computed energies is below the predetermined number (e.g., counter threshold). In operation 150, the process flow 100 determines whether there is another known audio frequency standard of interest in the current band energy spectrum. The process flow 100 goes to operation 110 and restarts the standard detection from the first known frequency, i.e., repeats steps 110-180, if there is no other audio frequency standard of interest in the current band energy spectrum. The process flow 100 goes to the operation 120 and repeats the steps of computing, comparing and determining for the known audio frequency standard of interest, if another known audio frequency standard of interest is determined in operation 150.

The process flow 100 goes to operation 160, if the number of computed energies is above or equal to the predetermined number. In operation 160, the current known audio frequency standard of interest as detected is determined. In these embodiments, a decision logic (e.g., the decision logic 330 of FIG. 3) is used to compare the computed energy at each of the known audio frequency standards of interest to the predetermined threshold energy and further to determine one or more of the audio frequencies of interest as detected based on the outcome of the comparison. In some embodiments, determining at each known audio frequency standard of interest whether the audio frequency standard of interest is detected based on the outcome of the comparison includes determining adjacent channel noise/signal energies that can substantially interfere with detected each known audio frequency standard of interest by substantially scanning around one or more known audio frequency standards of interest.

In operation 170, the detected current known audio frequency standard of interest is forwarded along with previously detected carriers to either
 display the carriers have been detected or
 display audio frequency standards of interest detected for either real-time demodulation to the decoder or as a status indicator to the external interface/user/microcontroller based on carriers detected.

In some embodiments, a SIF core (i.e., the SIF core 320 of FIG. 3) is used to receive the detected one or more of the audio frequency standards of interest and demodulate each of the one or more of the audio frequency standards of interest. In one example embodiment, demodulation refers to decoding which represents the process of retrieving the audio from the RF signal in a receiver.

Figure 6:
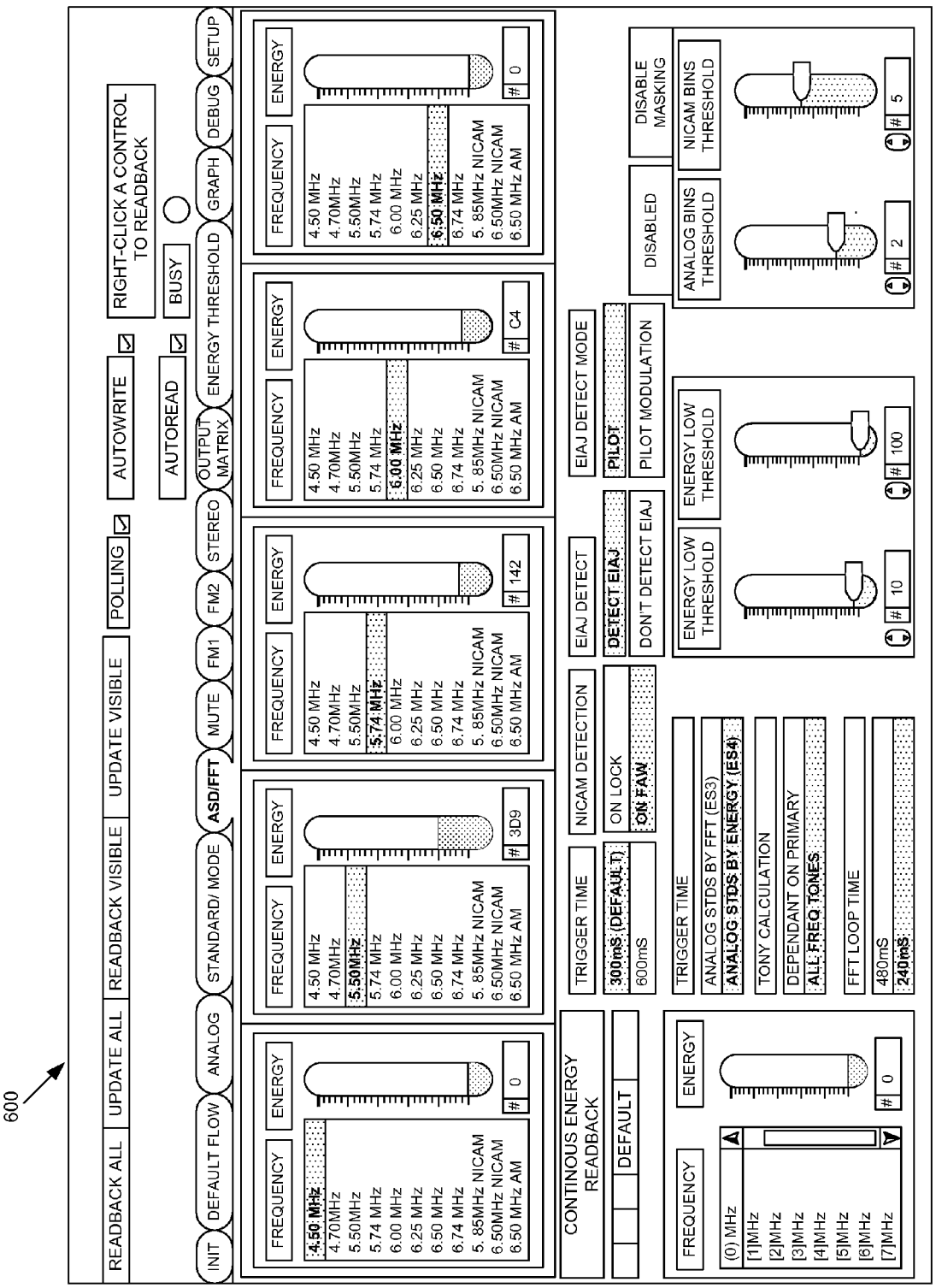
FIG. 6 is a graphical user interface (GUI) displaying the detected audio frequency standards of interest along with associated computed energies in an received broadcast signal, according to another embodiment.

In operation 180, the process flow 100 determines whether there is another known audio frequency standard of interest in the current band energy spectrum. The process flow 100 goes to the operation 120 and repeats the steps of computing, comparing and determining for the known frequency of interests, if another known audio frequency standard of interest is determined in operation 180. The process flow 100 goes to operation 110 and repeats the steps of scanning, computing, comparing and determining for a next band energy spectrum in the incoming broadcast signal, if there is no other audio frequency standard of interest in the current band energy spectrum. In some embodiments, the detected audio frequency standards of interest along with the associated computed energies in the received broadcast signal are displayed on a display device by the graphical user interface (GUI) (e.g., the GUI 600 as illustrated in FIG. 6) based on the outcome of the comparison.

In some embodiments, the inputs needed for the Goertzel DFT 310 or FFT or any energy estimation algorithms are stored in mux based memory. For example, consider 10 standard frequencies of interest in a current band energy spectrum as 4.5 MHz, 4.742 MHz, 5.5 MHz, 5.742 MHz, 5.85 MHz, 6.0 MHz, 6.258 MHz, 6.5 MHz, 6.552 MHz and 6.742 MHz. Among these, the frequencies 4.5 MHz, 5.5 MHz, 6.5 MHz, and 6 MHz are main tone frequencies and remaining frequencies are secondary-tone frequencies. The automatic Audio Standard Detection (ASD) Scheme first checks for the presence of the main tones. In one embodiment, consider that 5 predetermined number of frequencies indexed around each valid main tone frequency (standard frequency) to be detected are calculated. So, the index will be in the range of about 0 to max 19 (20 indexes), i.e., the starting index will be 0 and the ending index will be 19. In another embodiment, the predetermined number of frequencies indexed around each frequency carrier may be set to a lower or higher value (e.g., lower or higher than 5).

If any main tone frequency gets detected, then ASD scheme checks for the corresponding sub-tone frequencies. For example, if 5.5 MHz is detected, then the ASD scheme will check for 5.742 MHz and 5.85 MHz and confirms standard accordingly and goes back to index 0. If no main tone gets detected then it checks for NICAM frequencies, i.e., 5.85 MHz and 6.552 MHz. If no frequency presents, then it goes back to index 0. So the starting index and ending index will vary according to these conditions mentioned above.

In another embodiment, all sub tones are scanned irrespective of whether a main tone is scanned. For example, the index starts from 0 and check all 10 frequencies, i.e., goes right up to 49{5(freq's around each tone)*10(tones) minus 1 (as index starts from 0)}.

In these embodiments, when checking for main tones, high threshold is used for comparison and for sub-tones, low threshold is used for comparison. These two hi-lo thresholds are the main control registers which needs to be changed based on the input level and any AGC (Automatic Gain Correction) related issues at the input. If the expected energy is low, then reduce both high and low thresholds. For example, if NICAM level is reduced compared to FM (Frequency Modulation), the low threshold needs to be reduced to get proper detection.

Further in one embodiment, there is a register named for example, as i2c_cnt_select which is the counter threshold.

This counter threshold is used to decide/program number of the predetermined frequencies around each tone greater than Hi or Lo threshold to indicate that the frequency tone is detected. The normal value is 3 for Main tones, 2 for secondary tones and its highest value is 5 in case of NICAM 5.85 MHz and 6.552 MHz. For expected lower spread at the input, the count select can be reduced to some lower value. These are the main registers that are needed for the control logic. Apart from these, the scheme allows to read back the energy corresponding to a particular frequency. For this, the target frequency can be programmed through one register or any input interface and the corresponding energy can be read back through another register or any output interface. The value that has to be programmed for a particular frequency is the corresponding index value.

In another embodiment in operation 120, the energies computed for predetermined number of frequencies around each known audio standard frequency can be weighted and/or averaged for each known standard frequency. Further, the weighted and/or averaged value is compared with one or more thresholds to indicate that a particular frequency is detected for each known audio standard frequency.

In another embodiment the weighted and/or averaged value can be provided as output status for the user or to external interface.

Figure 2:
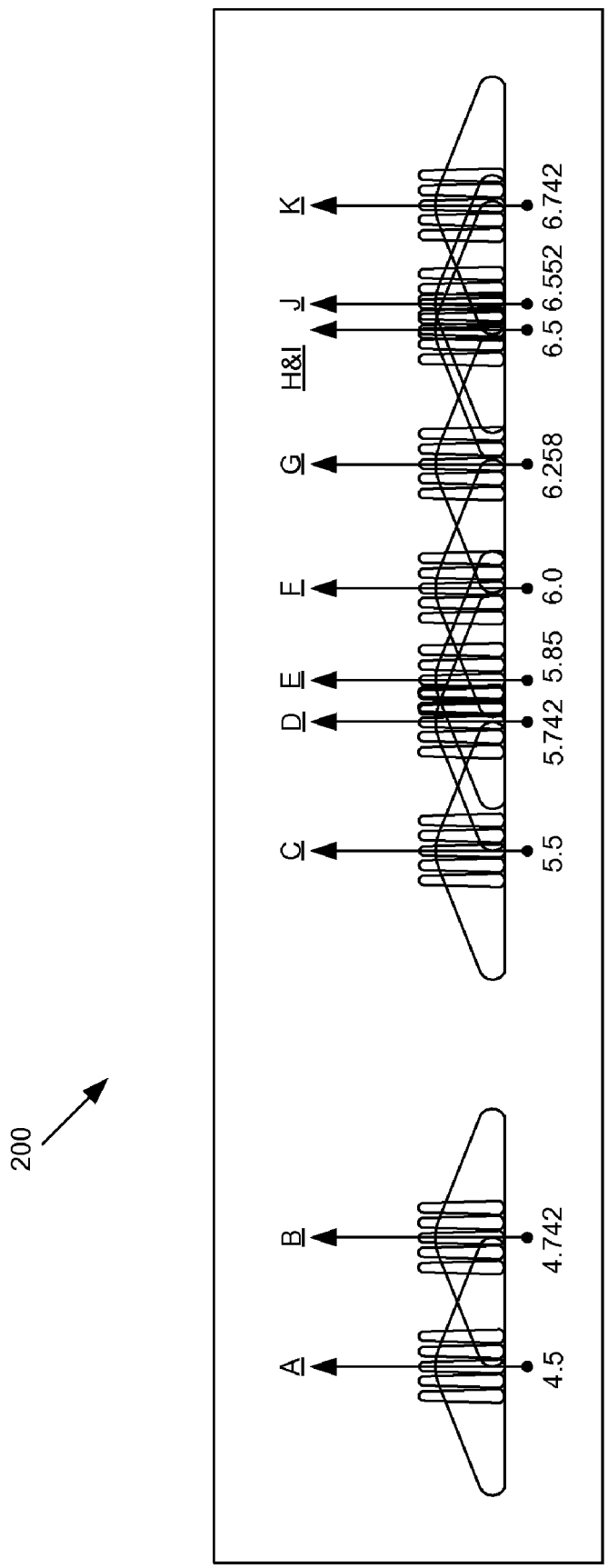
FIG. 2 is a graph showing scanning of frequencies using Goertzel DFT for each known audio frequency standard of interest, according to one embodiment.

FIG. 2 is a graph 200 showing scanning of frequencies using Goertzel DFT 310 for each known audio frequency standard of interest, according to one embodiment. In these embodiments, the graph 200 illustrates the frequency spectrum and the corresponding energies for the audio frequency standards of interest in the band energy spectrum in the range of about 0 to max 10 MHz. In the example embodiment illustrated in FIG. 2, the audio standards frequencies 4.5, 4.742, 5.5, 5.742, 5.85, 6.0, 6.258 6.5, 6.5 and 6.742 MHz are the frequencies of interest that need to be scanned in the band energy spectrum of the incoming broadcast signal.

In some embodiments, the Goertzel DFT 310 is used to estimate energies across spectrum at particular frequencies and then the control logic is used to switch between the audio frequency standards of interest. In addition, the Goertzel's algorithm 310 calculates the energies at five different frequencies around each frequency including the frequency of interest, to avoid false detection. In one embodiment, the Goertzel's algorithm 310 may calculate the energies at more or less than five frequencies around each frequency including the frequency of interest, to avoid false detection. The five surrounding frequencies may be selected depending upon the expected spread in the spectrum according to specification. For example, in the case of 5.85 NICAM standard, the five frequencies around this frequency are 5.85−0.15, 5.85−0.075, 5.85, 5.85+0.075, and 5.85+0.15.

Further in these embodiments, Goertzel's algorithm 310 estimates the energies at all the five frequencies and the control logic checks for the number of frequencies above threshold. In some embodiments, the threshold values can be programmable through i2c (i.e., Inner IC). Then, the presence of the frequency will be identified if the number of surrounding frequencies, which has the energy above threshold, are greater than or equal to i2c_cnt_sel (e.g., a programmable value). For example, the value is fixed as 5 in case of NICAM.

Figure 3:
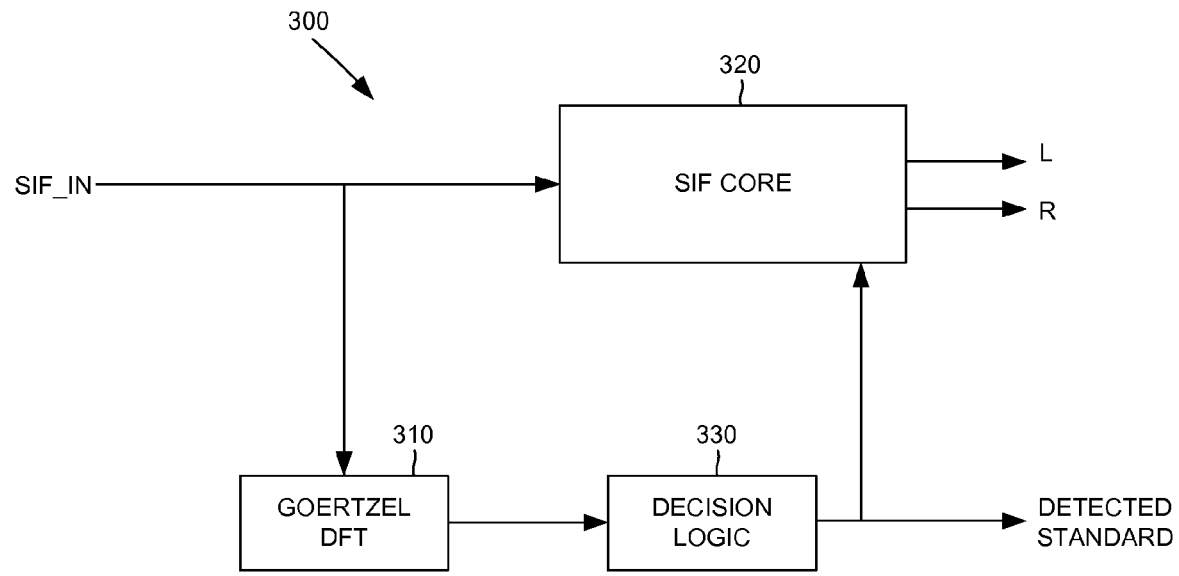
FIG. 3 is a block diagram illustrating a terrestrial broadcast signal receiver that is based on a continuous automatic audio standard detection in terrestrial broadcast, according to one embodiment.

FIG. 3 is a block diagram 300 illustrating a terrestrial broadcast signal receiver that is based on a continuous automatic audio standard detection in terrestrial broadcast, according to one embodiment. Particularly, FIG. 3 illustrates a Goertzel DFT 310 and a SIF core 320 that are configured to receive a broadcast signal such as a television signal, a radio signal and so on. Also as shown in FIG. 3, the continuous automatic audio standard detection unit 300 includes a decision logic 330 coupled between the Goertzel DFT 310 and the SIF core 320. In some embodiments, the terrestrial broadcast signal receiver illustrated in FIG. 3 can be any one of a television receiver and a radio receiver.

In operation, the Goertzel DFT 310 is configured to receive the broadcast signal (i.e., SIF_IN) and computes energy substantially around each of known audio frequency standards of interest within a current SIF frequency band for a predetermined time interval. In some embodiments, the Goertzel DFT 310 computes energy across the entire SIF band. The Goertzel DFT 310 computes energy based on a second order filter for each of the known audio frequency standards of interest within a current band energy spectrum. In these embodiments, the Goertzel DFT 310 also computes energy substantially around each of known audio frequency standards of interest within a next band energy spectrum for a predetermined time interval.

The SIF core 320 receives the detected one or more of the audio frequency standards of interest and demodulates each of the one or more of the audio frequency standards of interest. In these embodiments, the detected one or more of the audio frequency standards of interest comprises the detected one or more of analog frequency standards (e.g., primary and secondary analog frequency standards) or digital frequency standards (e.g., primary and secondary analog frequency standards). The decision logic 330 is used to compare the computed energy at each of the known audio frequency standards of interest to the predetermined threshold energy. The decision logic 330 also determines one or more of the audio frequency standards of interest as detected based on the outcome of the comparison. In some embodiments, determining at each known audio frequency standard of interest whether the audio frequency standard of interest is detected based on the outcome of the comparison includes determining adjacent channel noise/signal energies that can substantially interfere with detected each known audio frequency standard of interest by substantially scanning around one or more known audio frequency standards of interest.

In the example embodiment illustrated in FIG. 3, the block diagram 300 illustrates the Goertzel DFT 310 and the SIF core 320 configured to receive an SIF_IN input signal (i.e., an incoming broadcast signal) from one or more of the audio frequency standards of interest.

In operation, the Goertzel DFT 310 computes energy for the one or more audio frequency standards of interest. In some embodiments, the Goertzel DFT 310 computes energy across the entire SIF frequency band. The computed energy is then outputted to the decision logic 330 which compares the computed energy to the predetermined threshold energy and determines one or more of the audio frequency standards of interest as detected based on the outcome of the comparison.

The detected one or more of the audio frequency standards of interest are then outputted to the SIF core 320 which demodulates each of the one or more of the audio frequency standards of interest. The above mentioned technique works without the need for external soft/hard intervention, runs parallel to the data path, and can be used to detect the standard dynamically. Under standard conditions, the detection scheme works for all the standards at normal energy levels. However, if the signal strength at the input is reduced than the expected one, the primary and secondary thresholds also accordingly need to be reduced to get proper detection.

Furthermore, the above mentioned technique can also detect adjacent channels by scanning a higher frequency. Typically, these adjacent channel energies can interfere with the audio signals of interest. In addition, the signals from the adjacent channels can significantly affect the terrestrial broadcast signals based on PAL-BG and/or NICAM-PG standards. Generally, the adjacent channel noise signals in terrestrial broadcast signals based on PAL-BG and/or NICAM-PG standards appear to be present substantially around 7 MHz. In some embodiments, adjacent channel noise/signal energies that can substantially interfere with detected each known audio frequency standard of interest is determined by substantially scanning around one or more known frequencies of interest.

Figure 4:
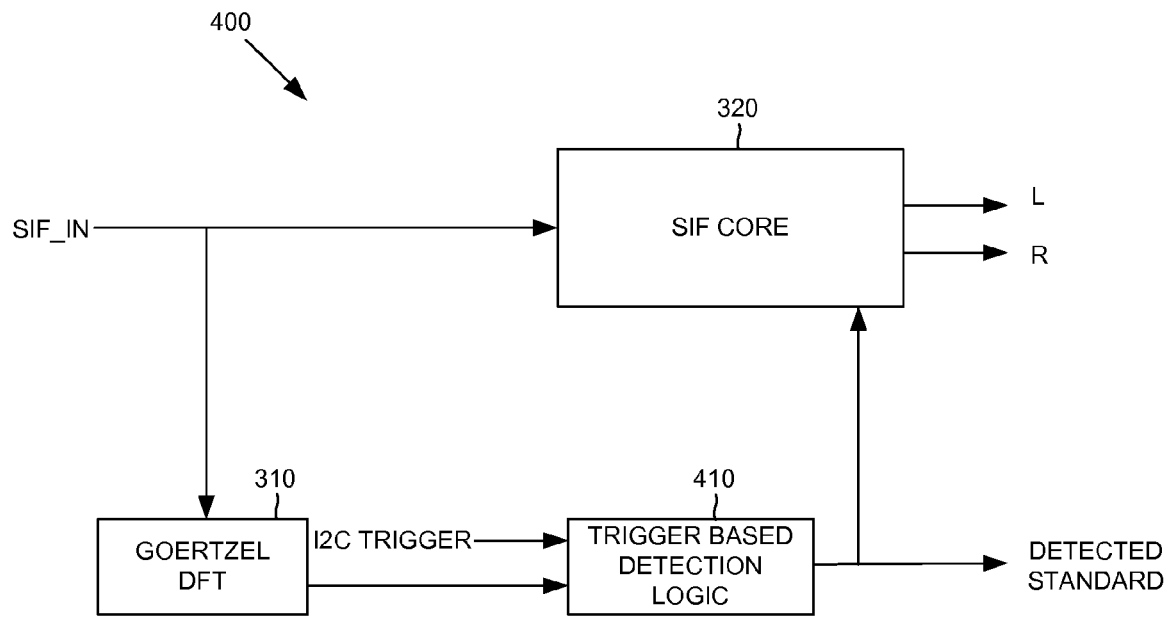
FIG. 4 is a block diagram illustrating a terrestrial broadcast signal receiver including a trigger based automatic audio standard detection in terrestrial broadcast, according to another embodiment.

FIG. 4 is a block diagram 400 illustrating a terrestrial broadcast signal receiver including a trigger based automatic audio standard detection in terrestrial broadcast, according to another embodiment. Particularly, FIG. 4 illustrates the Goertzel DFT 310 and the SIF core 320 that are configured to receive a broadcast signal. Also as shown in FIG. 4, the trigger based automatic audio standard detection unit 400 includes the trigger based detection logic 410 coupled between the Goertzel DFT 310 and the SIF core 320. In some embodiments, the terrestrial broadcast signal receiver including a trigger based automatic audio standard detection (e.g., illustrated in FIG. 4) can be any one of a television receiver and a radio receiver.

In operation, the trigger based detection logic 410 may be configured to analyze the detected one or more of the audio frequency standards of interest and output a trigger to the SIF core 320 to stop the demodulation and run the SIF core 320 in digital mode (i.e., NICAM mode) to determine for the presence of one or more of the digital audio frequency standards of interest. In one example embodiment, the trigger based detection technique is used to detect the presence of digital audio frequency standards of interest.

In the example embodiment illustrated in FIG. 4, the block diagram 400 illustrates the Goertzel DFT 310 and the SIF core 320 configured to receive the SIF_IN input signal (i.e., the broadcast signal) from one or more of the audio frequency signals. In operation, the Goertzel DFT 310 computes energy based on the received SIF_IN input signal. In some embodiments, the Goertzel DFT 310 computes energy across the entire SIF frequency band. The computed energy is then outputted to the trigger based detection logic 410 along with an i2c trigger, based on which the trigger based detection logic 410 analyzes the detected one or more of the audio frequency standards of interest and outputs a trigger to the SIF core 320 to stop demodulation and run the SIF core 320 in digital mode to determine for the presence of one or more of the digital audio frequency standards of interest.

In another embodiment, the trigger can be used to stop the SIF core 320 and run it to check the digital standard and/or to run it in analog standard to reconfirm the analog standard and reduce detection errors due to double check of the analog standard.

Figure 5:
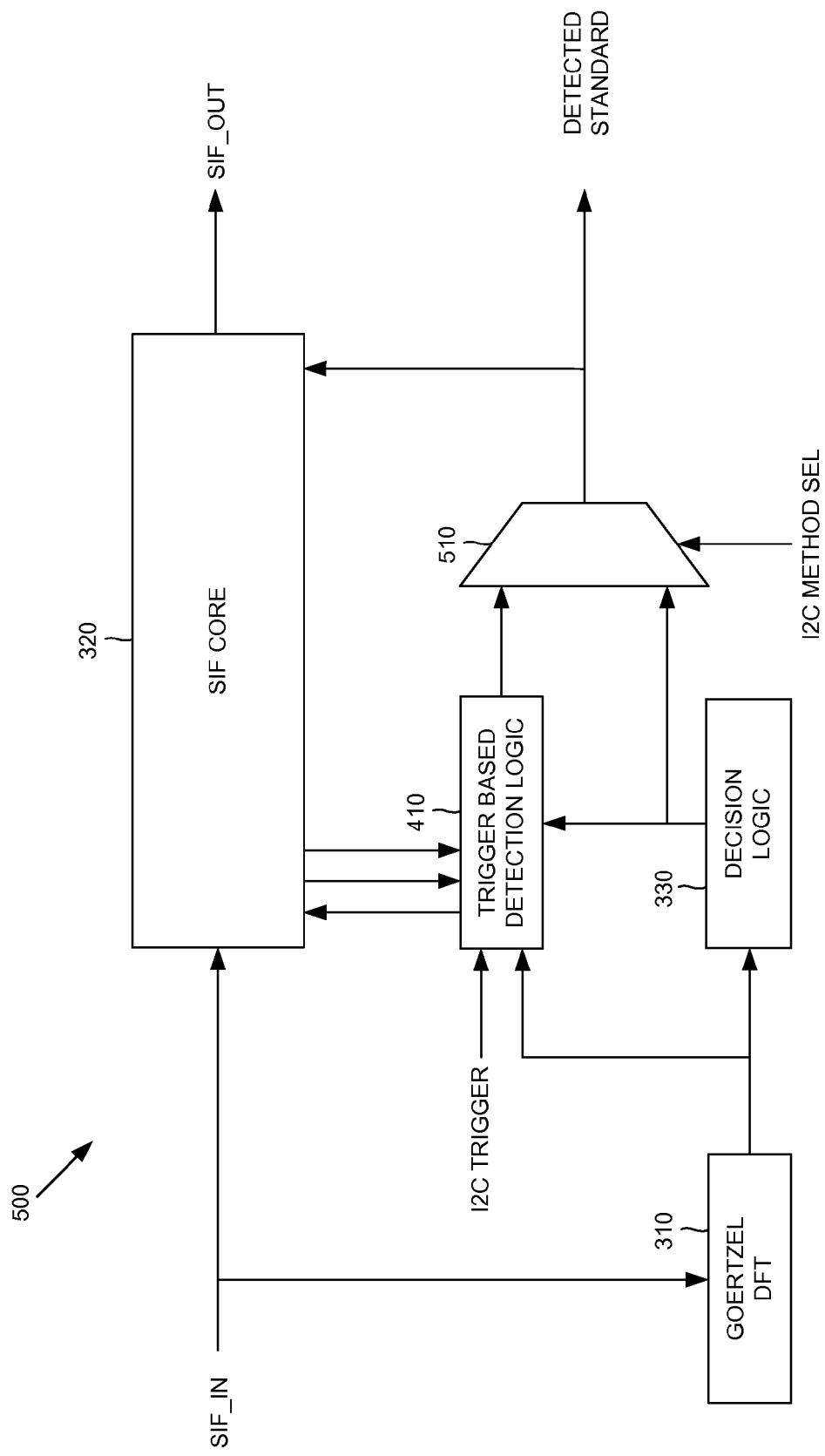
FIG. 5 is a block diagram illustrating a terrestrial broadcast signal receiver including a combination of continuous and trigger based automatic audio standard detection in terrestrial broadcast, according to another embodiment.

FIG. 5 is a block diagram 500 illustrating a terrestrial broadcast signal receiver including a combination of continuous and trigger based automatic audio standard detection in terrestrial broadcast, according to another embodiment. Particularly, FIG. 5 illustrates the Goertzel DFT 310 and the SIF core 320 that are configured to receive a broadcast signal. In some embodiments, the terrestrial broadcast signal receiver including a combination of continuous and trigger based automatic audio standard detection (e.g., illustrated in FIG. 5) can be any one of a television receiver and a radio receiver.

As illustrated in FIG. 5, the automatic audio standard detection unit 500 includes the decision logic 330, the trigger based detection logic 410 and a multiplexer 510 coupled between the Goertzel DFT 310 and the SIF core 320.

The operation of the automatic audio standard detection unit 500 is a combination of the operations explained in FIG. 3 and FIG. 4 except that the automatic standard detection unit 500 uses the multiplexer 510 to select one or more of the detected audio frequency standard of interest from the decision logic 330 and the trigger based detection logic 410 and forwards the detected one or more audio standard frequencies of interest to the SIF core 320 for demodulation. In some embodiments, the multiplexer 510 combines one or more of detected analog or digital audio frequency standards into a single detected signal based on an i2c option that is well known to one skilled in the art.

In operation, the trigger based detection logic 410 forces the SIF core 320 into a particular standard for a small period of time based on the i2c trigger and based on parameters from the decision logic 330. This period of time is the trigger period on time. During this time, normal operation of the SIF core 320 ceases. If the forced standard is detected by locking of internal parameters then the new standard is continuously programmed, otherwise the SIF core 320 returns back to the normal ASD mode after the end of the trigger period. The combined automatic audio standard detection unit 500 results in saving the detection time as there is an option for disabling certain frequency points.

The above mentioned technique enables to save the detection time through scanning for few standards of interests. In addition, it is possible to program any set of input frequencies which makes the design re-usable and provides a crude spectrum analysis tool for these applications.

FIG. 6 is a screenshot of a graphical user interface (GUI) 600 displaying the detected audio frequency standards of interest along with the computed energies in an received broadcast signal, according to another embodiment. In the example embodiment illustrated in FIG. 6, the graphical user interface 600 displays the detected audio frequency standards of interest along with the associated computed energies in the received broadcast signal (e.g., television broadcast signal, radio broadcast signal, etc.) based on the outcome of the comparison. In these embodiments, the GUI 600 displays the energies detected and calculated at each known audio frequency standard of interest, which can be read by software and/or hardware to finally indicate the detected audio frequency standard on a display device.

In the embodiment shown in FIG. 6, the GUI 600 displays the energies calculated at five frequencies 4.50, 5.50, 5.74, 6.00 and 6.50 MHz as 0, 3D9, 142, C4 and 0 respectively on a display device. The decision logic 330 compares the computed energy at each known audio standard frequency of interest. Further, the one or more of the audio frequency standards of interest are detected by comparing each of the above computed energies to the predetermined threshold energy.

The above technique can use a standard or non standard energy estimation algorithm, such as Goertzel DFT 310 to scan and compute energy around known audio standard frequencies of interest in terrestrial broadcast. This technique is more efficient in computing an N-point DFT when the required number of DFT coefficients is less than $2 \log_2 N$. The above technique can process incoming broadcast signal dynamically and thereby reducing the storage requirement. The circuitry based on the above technique requires considerably less silicon area than compared to the circuitry based on the conventional FFT technique. Even though the above technique is described with reference to using Goertzel DFT 310, one can envision using the conventional FFT and drive the same benefit even if it consumes a larger silicon area than the one based on Goertzel DFT technique.

Furthermore, the above (DFT) technique can be easily adapted to scan and compute only needed known audio standard frequencies to significantly reduce the processing time. The above technique can be configured such that the user can program to process any set of known audio standard frequencies of interest and display the detected known audio standard frequencies of interest in a user friendly interface format. Even though the above automatic audio standard detection technique is described using a Goertzel DFT 310, those skilled in the art can recognize that other discrete transformation can be substituted to achieve same result.

In addition, the above technique can detect a high adjacent channel that is residing next to the main channel. Adjacent channel is a separate transmission residing substantially adjacent to the main transmission that is being detected which can cause interference in the main transmission. For example, the adjacent channel is an additional frequency point and usually lies around 7 MHz for PAL/NICAM—BG transmission.

In another embodiment, the 10 or 11 frequency points from 4.5 MHz to 7 MHz as mentioned above can be entirely replaced with many more points spreading from 0 to around 10 MHZ. The result of which can be used by a user as a crude version of a spectrum analyzer to determine where the energy lies in a band. Such information can be useful in determining the quality of transmission and subsequent demodulation.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of automatically determining audio standard for terrestrial broadcast comprising:
    scanning for each audio frequency standard of interest in a current SIF frequency band in an incoming broadcast signal by using a energy estimation algorithm;
    computing energy at each known audio frequency standard of interest using the energy estimation algorithm within a predetermined time interval;
    comparing the computed energy at each audio frequency standard of interest to a predetermined threshold energy; and
    determining at each audio frequency standard of interest whether the audio frequency standard of interest is detected based on the outcome of the comparison,
    wherein computing the energy at each audio frequency standard of interest using the energy estimation algorithm comprises:
        computing the energy for a predetermined number of audio frequencies indexed substantially around each known audio frequency standard of interest within the current SIF frequency band;
        comparing each computed energy that is substantially around each audio frequency standard of interest with a predetermined threshold value and determining a number of computed energies that are above or equal to the predetermined threshold value; and
        comparing the determined number of computed energies to a predetermined number and determining at each audio frequency standard of interest whether audio frequency standard of interest is detected.

2. The method of claim 1, wherein, in scanning, the audio frequency standard of interest comprises an analog audio frequency standard or a digital audio frequency standard.

3. The method of claim 2, wherein the analog audio frequency standard or the digital audio frequency standard comprises: primary and secondary analog audio standard frequencies or primary and secondary digital audio standard frequencies.

4. The method of claim 1, wherein scanning for each known audio frequency standard of interest in the current SIF frequency band comprises: dynamically scanning for each known audio frequency standard of interest in the current SIF frequency band substantially parallel with demodulation operation without interrupting the demodulation operation.

5. The method of claim 1, wherein the energy estimation algorithm is based on at least one of a Goertzel DFT and a FFT based algorithm.

6. The method of claim 5, wherein, in scanning, Goertzel's algorithm filters are derived using the following equation:

$$H_k(Z) = (1 - W^*_N Z^{-1}) / (1 - 2\cos(2\pi K/N) Z^{-1}) + Z^{-2}).$$

7. The method of claim 6, wherein, in scanning, each of the Goertzel's algorithm filters comprises a second-order filter.

8. The method of claim 1, wherein the predetermined threshold energy comprises: primary and secondary threshold energies.

9. The method of claim 1, further comprising: forwarding the detected one or more known audio frequency standards of interest to display detected carriers or audio frequency standards for real-time demodulation.

10. The method of claim 1, further comprising: repeating the steps of scanning, computing, comparing and determining for a next band energy spectrum in the incoming broadcast signal.

11. The method of claim 1, wherein determining at each known audio frequency standard of interest whether the audio frequency standard of interest is detected based on the outcome of the comparison further comprises: determining adjacent channel noise/signal energies that can substantially interfere with detected each known audio frequency standard of interest by substantially scanning around one or more known audio frequency standards of interest.

12. The method of claim 1, wherein the broadcast signal comprises at least one of a television signal and a radio signal.

13. An automatic audio standard detection unit for a terrestrial broadcast receiver comprising:
    a Goertzel DFT configured to receive a broadcast signal and compute energy substantially around a predetermined audio frequency standards of interest within a current SIF frequency band for a predetermined time interval for a predetermined number of audio frequencies indexed substantially around each of the audio frequency standard of interest; and
    a decision logic to compare each of the computed energy at each of the audio frequency standards of interest to a predetermined threshold energy, determine a number of computed energies that are above or equal to a predetermined number, compare the determined number of computed energies to a predetermined value, and determine one or more of the audio frequency standards of interest as detected based on the outcome of the comparisons.

14. The audio standard detection unit of claim 13, further comprising: a SIF core to receive the detected one or more of the audio frequency standards of interest and demodulate each of the one or more of the audio frequency standards of interest.

15. The audio standard detection unit of claim 14 wherein the Goertzel DFT is based on a second order filter for each of the known audio frequency standards of interest within a current band energy spectrum.

16. The audio standard detection unit of claim 14, wherein the Goertzel DFT computes energy substantially around each of known audio frequency standards of interest within a next band energy spectrum for a predetermined time interval.

17. The audio standard detection unit of claim 13, further comprising: a graphical user interface (GUI) to display the detected audio frequency standards of interest along with the associated computed energies in the received broadcast signal based on the outcome of the comparison.

18. The audio standard detection unit of claim 17, wherein the Goertzel DFT further computes energy across the entire SIF frequency band.

19. The audio standard detection unit of claim 17, wherein the detected one or more of the audio frequency standards of interest comprise detected one or more of analog audio frequency standards or digital audio frequency standards.

20. The audio standard detection unit of claim 17, further comprising a trigger based logic that is configured to analyze the detected one or more of the audio frequency standards of interest and output a trigger to a SIF core to stop the demodulation and run the SIF core in digital mode (NICAM mode) to determine for the presence of one or more of the digital audio frequency standards.

21. An automatic audio standard detection unit for a terrestrial broadcast receiver comprising:
    an FFT configured to receive a broadcast signal and compute energy substantially around each predetermined audio frequency standards of interest within a current SIF frequency band for a predetermined time interval for a predetermined number of audio frequencies indexed substantially around each known audio frequency standard of interest; and
    a decision logic to compare each of the computed energy at each of the audio frequency standards of interest to a predetermined threshold energy, determine a number of computed energies that are above or equal to a predetermined value, compare the determined number of computed energies to a predetermined number, and determine one or more of the audio frequency standards of interest as detected based on the outcome of the comparisons.

22. The audio standard detection unit of claim 21, further comprising: a SIF core to receive the detected one or more of the audio frequency standards of interest and demodulate each of the one or more of the audio frequency standards of interest.

23. The audio standard detection unit of claim 21, further comprising: a graphical user interface (GUI) to display the detected audio frequency standards of interest along with the associated computed energy in the received broadcast signal on a display device based on the outcome of the comparison.

24. The audio standard detection unit of claim 21, wherein the detected one or more of the audio frequency standards of interest comprise detected one or more of analog audio frequency standards or digital audio frequency standards.

25. A method of automatic audio standard detection, comprising:
    scanning a spectrum corresponding to a predetermined audio frequency standard of interest;
    measuring energy levels for a plurality of audio frequencies indexed substantially around the audio frequency standard of interest, wherein the measuring energy levels is performed based on a Goertzel DFT or a FFT based algorithm;
    comparing each measured energy level to a predetermined energy threshold;
    based on a number of measured energy levels that equal or exceed the predetermined energy threshold, determining whether a broadcast signal is being transmitted on the audio frequency standard of interest.

26. The method of claim 25, further comprises repeating the method for other predetermined audio frequency standard of interest.

27. The method of claim 25, wherein the audio frequency standard of interest is an analog audio frequency standard of interest.

28. The method of claim 25, wherein the audio frequency standard of interest is a digital audio frequency standard of interest.

29. The method of claim 25, wherein the audio frequency of standard comprises primary and secondary standard frequencies.

30. The method of claim 25, further comprises forwarding the determined audio frequency standard of interest to display detected carriers or audio frequency standards for real-time demodulation.

31. The method of claim 25, further comprises determining interfering adjacent channel noise/signal energies of the known audio frequency standard of interest by substantially scanning around the known audio frequency standards of interest.

32. The method of claim 25, wherein the broadcast signal is a television signal.

33. The method of claim 25, wherein the broadcast signal is a radio signal.

34. A method of operating a receiver, comprising:
    performing an automatic audio standard detection in parallel with demodulation operations of the receiver, the automatic audio standard detection comprises:
        scanning a spectrum corresponding to a predetermined audio frequency standard of interest;
        measuring energy levels using a Goertzel DFT;
        comparing each measured energy level to a predetermined energy threshold;
        based on the comparison, determining whether a broadcast signal is being transmitted on the audio frequency standard of interest,
    wherein the automatic audio standard detection is performed without interrupting the demodulation operations.

35. The method of claim 34, wherein determining whether a broadcast signal is being transmitted on the audio frequency standard of interest is based on a number of measured energy levels that equal or exceed the predetermined energy threshold.

36. The method of claim 34, further comprises repeating the method for other predetermined audio frequency standard of interest.

* * * * *